Patented Apr. 14, 1953

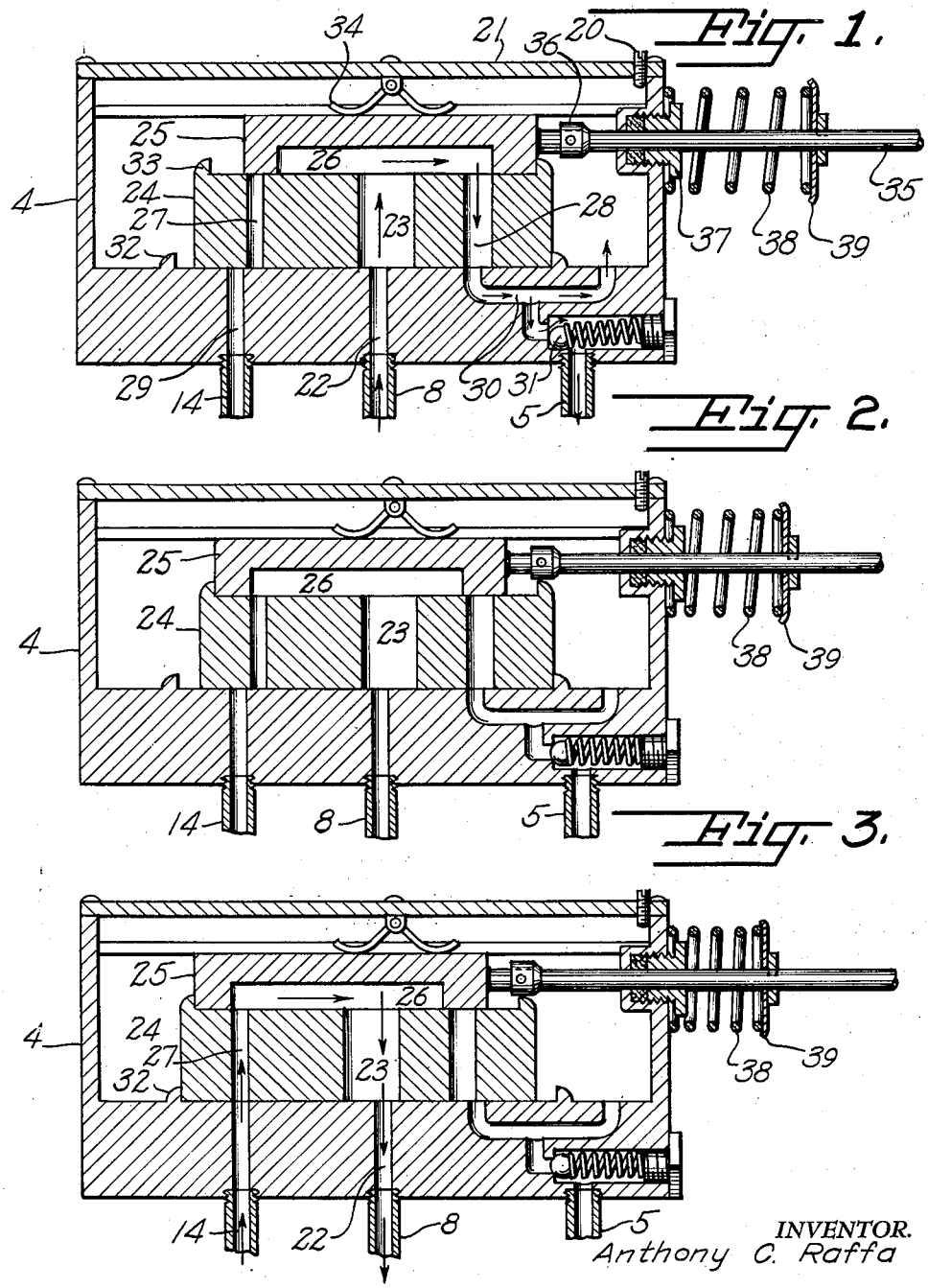

2,634,750

UNITED STATES PATENT OFFICE 2,634,750

VALVE FOR ENGINE POWERED BRAKE MECHANISM

Anthony C. Raffa, Perryville, Mo.

Application August 2, 1948, Serial No. 42,065

3 Claims. (Cl. 137—620)

The present invention relates to the general class of hydraulic braking systems for road vehicles, and more specifically to an improved valve for engine powered brake mechanism which while adapted for various purposes and uses is especially designed for operating the wheel brakes of automobiles and light trucks. The primary purpose of the invention is the provision of an engine powered, pedal controlled braking system or operating mechanism of the hydraulic type, that is compactly arranged and mounted on the vehicle, and which may be operated and controlled with facility for applying, maintaining, and releasing the wheel brakes at will. In the preferred form of my invention the brake control pedal is combined with the throttle operating mechanism of the vehicle, for pre-selective use, whereby the brake operating system or mechanism is energized with convenience by selective use of the pedal while the engine or motor is running.

In the physical embodiment of my invention I utilize a minimum number of compactly arranged parts that may with facility be manufactured at low cost of production, and the parts may be assembled and installed with convenience, to assure a reliable, pedal-controlled and automatically operating braking mechanism that is quick-acting and efficient in the performance of its functions.

The invention consists in certain novel features of construction and combinations and arragements of parts as will hereinafter be described and more particularly set forth in the appended claims.

In the accompanying drawings I have illustrated a complete embodiment of my invention, in which the parts are combined and arranged in accord with one mode I have devised for the practical application of the principles of my invention. It will however, be understood that changes and alterations are contemplated and may be made in these exemplifying drawings, within the scope of my claims, without departing from the principles of the invention.

Figure 1 is a longitudinal vertical detail sectional view of the valve control unit, showing the parts in brake-released position; Figure 2 is a similar view with parts in position to retain the applied brakes; and Figure 3 depicts the parts in position for applying the brakes of the vehicle.

Referring more in detail to the drawing controlling valve mechanism or unit for the system is enclosed within a housing 4 which is connected by a return pipe 5 to a fluid supply tank not shown.

The valve mechanism within the housing controls pressure of the motive fluid through the brake-supply pipe 8 that is extended through branch pipes to the usual brake cylinders of brake mechanisms that are instrumental in applying and releasing the usual wheel brakes of the vehicle.

A conventional engine-operated rotary pump is connected by its intake pipe with the supply tank, and the outlet pipe from the pump is connected with a casing that forms a fluid pressure reservoir for storing and emergency use, and the reservoir is equipped with a valve device for regulating the output of the pump; a check valve being employed in the pump pipe or main pressure pipe to prevent back pressure toward the pump.

The reserve reservoir is also connected, as by pipe 14 to the valve control housing 4 at its end opposite to the connection of the return pipe 5 with the housing.

In the detail sectional view of Fig. 1, the pedal operated control unit is shown with parts in brake release position and fluid under pressure from the brake cylinders (not shown) flows through pipe 8, and outlet pipe 5 to the supply. A breather or venting plug 20 is provided in the removable cover 21 of the casing or housing 4.

As shown in the three sectional drawings Figs. 1, 2 and 3 the brake cylinder pipe 8 is connected with a port 22 in the bottom wall of the housing 4, and this port is constantly open to a larger central port 23 of a slide block 24, which block, together with a slide-head 25, forms a two-piece differential slide valve for controlling various parts in the operation of the braking system.

The slide-head 25 of the valve is provided with an elongated port or duct 26 that is constantly open to port 23, and the slide head of the valve is adapted to alternately open and close a reserve port 27 and an inlet supply port 28 in the adjustable slide block 24 of the valve device, which ports register respectively, with the fixed ports 29 and 30 in the bottom of the housing 4.

The port 30, which opens to the interior of the chamber formed by the housing 4 is provided with a spring-seated ball valve 31, which is here shown in Fig. 1 in open position to permit return of fluid under pressure from the brake cylinders to the closed chamber and to the supply circuit.

The two pieces of the differential valve are relatively movable and reciprocable, the ported slide block 24 being limited in its sliding adjustment by means of spaced lugs 32 or other suitable stops rigid with the inner face of the bottom wall of the housing 4, and the relatively adjustable slide head 25 is limited in its reciprocating movement by opposed and spaced stop lugs 33 carried by the slide block. By this arrangement of parts the two pieces of the valve may be jointly and simultaneously adjusted, or separately and relatively adjusted, and the differential valve as a unit is resiliently held in operative position within the housing by means of a depressing spring blade 34 attached to the inner face of the housing cover, and bearing upon the top surface of the valve-head.

For reciprocating the differential control valve, an actuating stem 35 is flexibly jointed within the housing at 36 to the valve head, and the stem, which slides through a packed bearing 37 in an upright wall of the housing, is provided with an exterior retracting spring 38 and its adjustable stop-collar or washer 39. The spring resiliently holds the differential valve in normal or neutral released position and retracts the valve after the brake pedal is released by the operator or driver of the vehicle.

For applying the brakes as in Fig. 3 the pedal is depressed to project the differential valve to the limit of its outward movement, thereby coupling the inlet ports 29 and 27 with the duct 26, and this movement opens duct 26 through the fixed port 22 to the brake cylinder pipe 8, through which pressure is applied to the brake cylinders for an application of the wheel brakes.

For maintaining an application of the brakes as in Fig. 2, the pedal is partially released to permit resilient retraction of the slide block 24, inwardly or to the right against one of the stops 32 of the housing, thereby disconnecting ports 29 and 27, and then by a partial or slight pressure against the valve stem the valve-head is shifted outwardly or to the left against one of the stops 33 of the slide block to close port 28, thus holding the previously applied pressure within duct 26, port 23 and 22 which are constantly open to the brake line or pipe 8. In this position of parts the spring pressed ball valve 31 closes communication between the return pipe 5 and the interior of the valve chamber of the housing 4 to prevent entrance or leakage of air into the brake operating system.

For releasing the applied brakes, when the driver releases the control pedal, the spring 38, by expansion, retracts the valve head against a stop 33, and continued expansion of the spring retracts the slide block against one of the fixed stops 32 of the housing.

The emergency, storage, and reserve reservoir of the operating system is instrumental in receiving and maintaining a fluid output pressure from the pump that is ample to furnish power for a number of successive applications of the brakes in the absence of power from the engine and while the pump is idle, when the engine is not running; and means are provided for use of the pump pressure throughout the system when the engine and pump are running.

Having thus fully described my invention, what I claim as new and desire to secure by Letters Patent is:

1. In pedal operated valve mechanism for fluid pressure in a hydraulic braking system, the combination with a housing having a central pressure-outlet port and spaced inlet and return ports, of a slide block reciprocable within the housing having a central port constantly open to the outlet port and ports controlling the inlet and return ports, a first duct communicating with the inlet port in the slide block and the interior of the housing, a second duct connecting said first duct to the return port in said housing and a check valve for said return port to prevent the flow of fluid from entering the housing contrary to the normal flow of fluid through the housing and a valve head slidably mounted on the block and having an elongated duct open to the central port and adapted to control communication with the spaced inlet, outlet and return ports, stop lugs in said housing at the opposite ends of said slide block for controlling the movement of said slide block in relation to the ports in said housing, and stop lugs on said slide block at opposite ends of said valve head to control the movement of said valve head with relation to the ports in said slide block.

2. In a pedal operated valve mechanism for a hydraulic braking system, the combination with a housing having a central outlet port and spaced inlet and return ports, of a slide block having a central port constantly open to the outlet port and spaced ports co-acting with the inlet and return ports, stop means in said housing at opposite ends of said slide block for limiting the movement of the slide block, a first duct communicating with the inlet port in the slide block and the interior of the housing, a second duct connecting said first duct to the return port in said housing and a check valve for said return port to prevent the flow of fluid from entering the housing contrary to the normal flow of fluid through the housing, a valve head slidable on the block and stop means on said slide block at opposite ends of said valve head for limiting the movement of the head, and said head having an elongated duct open to the central port and adapted to control communication with the spaced ports.

3. In a pedal operated valve mechanism as in claim 2 wherein an actuating stem is made rigid with the valve head and a retract spring is mounted on the valve stem.

ANTHONY C. RAFFA.

References Cited in the file of this patent

UNITED STATES PATENTS

| Number | Name | Date |
| --- | --- | --- |
| 931,238 | Turner | Aug. 17, 1909 |
| 1,723,032 | Harrington | Aug. 6, 1929 |
| 1,742,426 | Thomas | Jan. 7, 1930 |
| 1,877,700 | Silvene | Sept. 13, 1932 |
| 1,938,854 | Moulet | Dec. 12, 1933 |
| 1,942,646 | Hueber | Jan. 9, 1934 |
| 1,998,811 | Heaton | Apr. 23, 1935 |
| 2,021,798 | McCune | Nov. 19, 1935 |
| 2,042,186 | Peterson | May 26, 1936 |
| 2,165,096 | Frechette | July 4, 1939 |
| 2,319,941 | McNeal | May 25, 1943 |
| 2,347,932 | Bush | May 2, 1944 |
| 2,349,310 | Schnell | May 23, 1944 |
| 2,368,043 | Schnell | Jan. 23, 1945 |
| 2,385,733 | Schroer | Sept. 25, 1945 |
| 2,477,237 | Carr | July 26, 1949 |